US011739176B2

(12) United States Patent
Negretti

(10) Patent No.: US 11,739,176 B2
(45) Date of Patent: Aug. 29, 2023

(54) FORMULATED POLYOL COMPOSITONS

(71) Applicant: PBBPolisur S.R.L., Buenos Aires (AR)

(72) Inventor: Alberto Fabian Negretti, Puerto Gral San Martín (AR)

(73) Assignee: Dow Global Technologies LLC, Midland, MI (US)

( * ) Notice: Subject to any disclaimer, the term of this patent is extended or adjusted under 35 U.S.C. 154(b) by 188 days.

(21) Appl. No.: 17/285,565

(22) PCT Filed: Oct. 14, 2019

(86) PCT No.: PCT/US2019/056043
§ 371 (c)(1),
(2) Date: Apr. 15, 2021

(87) PCT Pub. No.: WO2020/081416
PCT Pub. Date: Apr. 23, 2020

(65) Prior Publication Data
US 2021/0395437 A1  Dec. 23, 2021

Related U.S. Application Data

(60) Provisional application No. 62/745,618, filed on Oct. 15, 2018.

(51) Int. Cl.
*C08G 18/18* (2006.01)
*C08G 18/32* (2006.01)
*C08G 18/48* (2006.01)
*C08G 18/66* (2006.01)
*C08G 18/76* (2006.01)

(52) U.S. Cl.
CPC ..... *C08G 18/6607* (2013.01); *C08G 18/3218* (2013.01); *C08G 18/4816* (2013.01); *C08G 18/4829* (2013.01); *C08G 18/4883* (2013.01); *C08G 18/7671* (2013.01); *C08G 2110/0083* (2021.01)

(58) Field of Classification Search
None
See application file for complete search history.

(56) References Cited

U.S. PATENT DOCUMENTS

| 5,310,766 | A | 5/1994 | Baumann et al. |
| 7,893,124 | B2 * | 2/2011 | Emge ............... C08G 18/482 521/131 |
| 9,476,539 | B2 * | 10/2016 | Grieser-Schmitz ..... F16L 59/20 |
| 9,777,104 | B2 | 10/2017 | Boehnke et al. |
| 10,766,997 | B2 | 9/2020 | Casati et al. |
| 2013/0048137 | A1 * | 2/2013 | Grieser-Schmitz ......... C08G 18/1808 138/149 |
| 2015/0065592 | A1 * | 3/2015 | Girotti ............... C08G 18/092 521/128 |
| 2017/0002165 | A1 | 1/2017 | Riccio et al. |
| 2017/0096518 | A1 * | 4/2017 | Hernandez Garcia ...... B32B 27/065 |
| 2018/0022856 | A1 | 1/2018 | Wang et al. |
| 2018/0051121 | A1 * | 2/2018 | Micheletti ......... C08G 18/4879 |
| 2018/0282469 | A1 | 10/2018 | Golini et al. |
| 2019/0322790 | A1 * | 10/2019 | Rider ............... C08G 18/4825 |

FOREIGN PATENT DOCUMENTS

| CA | 2362505 | 8/2000 | |
| WO | 9960045 | 11/1999 | |
| WO | WO-2016036815 A1 * | 3/2016 | ............. B60N 3/048 |

OTHER PUBLICATIONS

International Preliminary Report on Patentability for related PCT Application PCT/US2019/056043, dated Apr. 29, 2021 (9 pgs).
International Search Report & Written Opinion for related PCT Application PCT/US2019/056043, dated Jan. 27, 2020 (13 pgs).

* cited by examiner

*Primary Examiner* — Melissa A Rioja
(74) *Attorney, Agent, or Firm* — Brooks, Cameron & Huebsch, PLLC

(57) ABSTRACT

Embodiments of the present disclosure are directed towards formulated polyol compositions that include a sucrose propoxylated polyol, a polyether triol, and a propoxylated homopolymer triol.

9 Claims, No Drawings

FORMULATED POLYOL COMPOSITONS

This application is a National Stage Application under 35 U.S.C. § 371 of International Application Number PCT/US2019/056043, filed Oct. 14, 2019 and published as WO 2020/081416 on Apr. 23, 2020, which claims the benefit to U.S. Provisional Application 62/745,618, filed Oct. 15, 2018, the entire contents of which are incorporated herein by reference in its entirety

FIELD OF DISCLOSURE

Embodiments of the present disclosure are directed towards formulated polyol compositions, more specifically, embodiments are directed towards formulated polyol compositions that include a sucrose propoxylated polyol, a polyether triol, and a propoxylated homopolymer triol.

BACKGROUND

Foams are dispersions in which a gas is dispersed in a liquid material, a solid material, or a gel material. Foams can be formed by a chemical reaction of polyols and isocyanate. Foams can be utilized for a number of various applications, including insulation, bedding, furniture, vehicle seating, and carpet backing, among others.

SUMMARY

The present disclosure provides formulated polyol compositions including a sucrose propoxylated polyol having an average hydroxyl functionality from 3.0 to 6.0, an average hydroxyl number from 360 to 460 mg KOH/g, and a number average molecular weight from 400 to 800; a polyether triol having an average hydroxyl functionality from 2.6 to 3.4, an average hydroxyl number from 100 to 200 mg KOH/g, and a number average molecular weight from 900 to 1200; a propoxylated homopolymer triol having an average hydroxyl functionality from 2.6 to 3.4, an average hydroxyl number from 300 to 500 mg KOH/g, and a number average molecular weight from 250 to 650; a surfactant; water; a crosslinker; and a catalyst selected from a blowing catalyst, a gel catalyst, and combinations thereof.

The present disclosure provides foam formulation including the formulated polyol composition and an isocyanate.

The present disclosure provides foam products formed by curing the foam formulations.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples can be used in various combinations. In each instance, the recited list serves only as a representative group and should not be interpreted as an exclusive list.

DETAILED DESCRIPTION

Formulated polyol compositions including a sucrose propoxylated polyol, a polyether triol, and a propoxylated homopolymer triol are disclosed herein. Advantageously, the formulated polyol compositions disclosed herein can provide an improved phase stability as compared to other compositions. The improved phase stability can be shown by a lack of phase separation over particular time intervals. In other words, the formulated polyol compositions do not phase separate over particular time intervals, i.e. the formulated polyol compositions are maintained as a single phase over particular time intervals. Improved phase stability can be advantageous for a number of applications, including A-side B-side type polyurethane applications. For A-side B-side type polyurethane applications, a polyol composition is withdrawn from a container, e.g., the B-side, to be mixed with an isocyanate, e.g., the A-side, for foam formation. Utilizing a phase stable polyol composition can help provide that a more uniform mixture of the A-side and the B-side are supplied for the foam formation. Advantageously, utilizing a more uniform mixture of the A-side and the B-side for the foam formation can help reduce undesirable foam defects that may result from ununiform supplies of the A-side and the B-side. Further, the formulated polyol compositions disclosed herein can be cured to provide foam products having one or more properties desirable for a number of applications, such as acoustic insulation and/or thermal insulation, among others.

The formulated polyol compositions disclosed herein include a sucrose propoxylated polyol. As used herein, "sucrose propoxylated polyol" refers to a compound formed via a reaction of sucrose and propylene oxide.

The sucrose propoxylated polyol can have an average hydroxyl functionality from 3.0 to 6.0. All individual values and subranges from 3.0 to 6.0 are included; for example, the sucrose propoxylated polyol can have an average hydroxyl functionality from a lower limit of 3.0, 3.2, 3.5, or 4.0 to an upper limit of 6.0, 5.7, 5.5, or 5.0.

The sucrose propoxylated polyol can have an average hydroxyl number from 360 to 460 mg KOH/g. All individual values and subranges from 360 to 460 mg KOH/g are included; for example, the sucrose propoxylated polyol can have an average hydroxyl number from a lower limit of 360, 370, or 380 mg KOH/g to an upper limit of 460, 440, or 420 mg KOH/g. Average hydroxyl number, as KOH, can be determined according to ASTM D4274.

The sucrose propoxylated polyol can have a number average molecular weight from 400 to 800 g/mol. All individual values and subranges from 400 to 800 g/mol are included; for example, the sucrose propoxylated polyol can have a number average molecular weight from a lower limit of 400, 450, or 500 g/mol to an upper limit of 800, 750, or 700 g/mol.

The sucrose propoxylated polyol can have an equivalent weight from 91.7 to 183.5 g/eq. Equivalent weight can be determined as a quotient of molecular weight and functionality. All individual values and subranges from 91.7 to 183.5 g/eq are included; for example, the sucrose propoxylated polyol can have an equivalent weight from a lower limit of 91.7, 103.2, or 114.7 g/eq to an upper limit of 183.5, 172.0, or 160.0.6 g/eq.

The sucrose propoxylated polyol can be prepared using known equipment, reaction conditions, and reaction components. For instance, the sucrose propoxylated polyol can be formed from reaction mixtures including sucrose, propylene oxide, glycerin, and monopropylene glycol, among other reaction components.

The sucrose propoxylated polyol may be obtained commercially. Examples of commercially available sucrose propoxylated polyol include, but are not limited to, polyols sold under the trade name VORANOL™, such as VORANOL™ 466, available from the Dow Chemical Company, among others.

The sucrose propoxylated polyol can be from 21 to 31 parts of the formulated polyol composition based upon 100 parts of the formulated polyol composition. All individual values and subranges from 21 to 31 parts are included; for example, the sucrose propoxylated polyol can be from a lower limit of 21, 22, or 24 to an upper limit of 31, 30, or 28 parts of the formulated polyol composition based upon 100 parts of the formulated polyol composition.

The formulated polyol compositions disclosed herein include a polyether triol. As used herein, "triol" refers to a compound having an average hydroxyl functionality from 2.6 to 3.4.

The polyether triol can have an average hydroxyl functionality from 2.6 to 3.4. All individual values and subranges from 2.6 to 3.4 are included; for example, the polyether triol can have an average hydroxyl functionality from a lower limit of 2.6, 2.7, or 2.8 to an upper limit of 3.4, 3.3, or 3.2.

The polyether triol can have an average hydroxyl number from 100 to 200 mg KOH/g. All individual values and subranges from 100 to 200 mg KOH/g are included; for example, the polyether triol can have an average hydroxyl number from a lower limit of 100, 115, or 125 mg KOH/g to an upper limit of 200, 190, or 180 mg KOH/g.

The polyether triol can have a number average molecular weight from 900 to 1200 g/mol. All individual values and subranges from 900 to 1200 g/mol are included; for example, the polyether triol can have a number average molecular weight from a lower limit of 900, 925, or 950 g/mol to an upper limit of 1200, 1150, or 1100 g/mol.

The polyether triol can have an equivalent weight from 300 to 400 g/eq. All individual values and subranges from 300 to 400 g/eq are included; for example, the polyether triol can have an equivalent weight from a lower limit of 300, 308.3, or 316.7 g/eq to an upper limit of 400, 383.3, or 366.7 g/eq.

The polyether triol can be prepared using known equipment, reaction conditions, and reaction components.

The polyether triol may be obtained commercially. Examples of commercially available polyether triols include, but are not limited to, polyether triols sold under the trade name VORATEC™, such as VORATEC™ SD-301, available from the Dow Chemical Company, among others.

The polyether triol can be from 12 to 22 parts of the formulated polyol composition based upon 100 parts of the formulated polyol composition. All individual values and subranges from 12 to 22 parts are included; for example, the polyether triol can be from a lower limit of 12, 13, or 15 to an upper limit of 22, 21, or 19 parts of the formulated polyol composition based upon 100 parts of the formulated polyol composition.

The formulated polyol compositions disclosed herein include a propoxylated homopolymer triol. As used herein, "propoxylated homopolymer triol" refers to a polyether polyol that is produced by polymerization of propylene oxide and an initiator. The initiator may be a glycerol, a glycerine, or combination thereof. Various mixing ratios for the polymerization may be utilized for different applications. Embodiments of the present disclosure provide that a terminal group of the polyether polyol, i.e. the propoxylated homopolymer triol, is a secondary hydroxyl group.

The propoxylated homopolymer triol can have an average hydroxyl functionality from 2.6 to 3.4. All individual values and subranges from 2.6 to 3.4 are included; for example, the propoxylated homopolymer triol can have an average hydroxyl functionality from a lower limit of 2.6, 2.7, or 2.8 to an upper limit of 3.4, 3.3, or 3.2.

The propoxylated homopolymer triol can have an average hydroxyl number from 300 to 500 mg KOH/g. All individual values and subranges from 300 to 500 mg KOH/g are included; for example, the propoxylated homopolymer triol can have an average hydroxyl number from a lower limit of 300, 315, or 325 mg KOH/g to an upper limit of 500, 475, or 450 mg KOH/g.

The propoxylated homopolymer triol can have a number average molecular weight from 250 to 650 g/mol. All individual values and subranges from 250 to 650 g/mol are included; for example, the propoxylated homopolymer triol can have a number average molecular weight from a lower limit of 250, 300, or 350 g/mol to an upper limit of 650, 600, or 550 g/mol.

The propoxylated homopolymer triol can have an equivalent weight from 83.3 to 216.7 g/eq. All individual values and subranges from 83.3 to 216.7 g/eq are included; for example, the propoxylated homopolymer triol can have an equivalent weight from a lower limit of 83.3, 100.0, or 116.7 g/eq to an upper limit of 216.7, 200, or 183.3 g/eq.

The propoxylated homopolymer triol can be prepared using known equipment, reaction conditions, and reaction components.

The propoxylated homopolymer triol may be obtained commercially. Examples of commercially available propoxylated homopolymer triols include, but are not limited to, propoxylated homopolymer triols sold under the trade name VORANOL™, such as VORANOL™ 450 N, available from the Dow Chemical Company, among others.

The propoxylated homopolymer triol can be from 0.1 to 8.0 parts of the formulated polyol composition based upon 100 parts of the formulated polyol composition. All individual values and subranges from 0.1 to 8.0 parts are included; for example, the propoxylated homopolymer triol can be from a lower limit of 0.1, 1.0, or 3.0 to an upper limit of 8.0, 7.0, or 6.0 parts of the formulated polyol composition based upon 100 parts of the formulated polyol composition.

The formulated polyol compositions disclosed herein include a surfactant. Surfactants for use in the preparation of polyurethane foams are well-known to those skilled in the art, and many are commercially available. The surfactant may help to provide for uniform cell formation and/or gas entrapment to achieve low density foams. The surfactant may be a silicone surfactant, a non-silicone surfactant, or a combination thereof. Examples of suitable silicone surfactants include, but are not limited to, TEGOSTAB™ B 8427, B-8404, B-8407, B-8409, and B-8462 from Evonik; L-5130, L-5180, L-5340, L-5440, L-6100, L-6900, L-6980, and L-6988 from MOMENTIVE™, and DC-193, DC-197, DC-5582, and DC-5598 from Dow Corning. Examples of non-silicone surfactants include, but are not limited to, oxyethylated alkylphenols, oxyethylated fatty alcohols, paraffin oils, castor oil esters, ricinoleic acid esters, turkey red oil, groundnut oil, paraffins, silicone surfactants, and fatty alcohols.

The surfactant can be from 0.5 to 5.0 parts of the formulated polyol composition based upon 100 parts of the formulated polyol composition. All individual values and subranges from 0.5 to 5.0 parts are included; for example, the surfactant can be from a lower limit of 0.5, 1.0, or 2.0 to an upper limit of 5.0, 4.5, or 4.0 parts of the formulated polyol composition based upon 100 parts of the formulated polyol composition.

The formulated polyol compositions disclosed herein include water. The water may be utilized as a blowing agent, for instance. The water can be from 11 to 21 parts of the formulated polyol composition based upon 100 parts of the formulated polyol composition. All individual values and subranges from 11 to 21 parts are included; for example, the water can be from a lower limit of 11, 12, or 14 to an upper limit of 21, 20, or 18 parts of the formulated polyol composition based upon 100 parts of the formulated polyol composition.

The formulated polyol compositions disclosed herein include a crosslinker. As used herein, the term "crosslinker" includes both compounds generally known as crosslinkers and compounds generally known as chain extenders or more simply extenders. Crosslinkers are compounds that contain two or more isocyanate-reactive groups, such as hydroxyl groups, primary amines, and secondary amines. Examples of crosslinkers include, but are not limited to, amines, including polyamines; polyhydric alcohols; polyoxyalkylene polyols; polyhydric aromatic compounds, and combinations thereof. Examples of amines include, but are not limited to, diethanolamine, triethanolamine, triisopropanolamine, diisopropanolamine, t-butyltolylenediamine, triaminonane, diethyltolylenediamine, chlorodiaminobenzene, 4,4'-methylene-bis-(3-chloro-2,6-diethylaniline), and combinations thereof. Examples of polyhydric alcohols include, but are not limited to, 1,3 butanediol; 1,4 butanedio; mono-, di-, and tri-ethylene glycols; 1,2,4-butanetriol; dipropylene glycol; glycerin; trimethylolpropane; pentaerythritol, 2,5-dimethyl-1,2,6-hexanetriol; glycerol; and combinations thereof.

The crosslinker can be from 0.5 to 5.0 parts of the formulated polyol composition based upon 100 parts of the formulated polyol composition. All individual values and subranges from 0.5 to 5.0 parts are included; for example, the crosslinker can be from a lower limit of 0.5, 1.0, or 2.0 to an upper limit of 5.0, 4.5, or 4.0 parts of the formulated polyol composition based upon 100 parts of the formulated polyol composition.

The formulated polyol compositions disclosed herein include a catalyst. The catalyst may be a blowing catalyst, a gel catalyst, a trimerization catalyst, or combinations thereof. As used herein, blowing catalysts and gel catalysts, may be differentiated by a catalytic propensity to promote either the urea (blow) reaction, in the case of the blowing catalyst, or the urethane (gel) reaction, in the case of the gel catalyst. A trimerization catalyst may be utilized to promote reactivity of the compositions. One or more embodiments provide that the catalyst is selected from a blowing catalyst, a gel catalyst, or a combination thereof.

Examples of blowing catalysts, e.g., catalysts that generally promote the blow reaction include, but are not limited to, short chain tertiary amines or tertiary amines containing an oxygen. For instance, blowing catalysts include bis-(2-dimethylaminoethyl)ether; pentamethyldiethylene-triamine, triethylamine, tributyl amine, N,N-dimethylaminopropylamine, dimethylethanolamine, N,N,N',N'-tetra-methylethylenediamine, and combinations thereof, among others. A specific example of a commercial blowing catalyst is NIAX A1 from MOMENTIVE.

Examples of gel catalysts, e.g., catalysts that generally promote the gel reaction, include, but are not limited to, organometallic compounds, cyclic tertiary amines and/or long chain amines, e.g., that contain several nitrogen atoms, and combinations thereof. Organometallic compounds include organotin compounds, such as tin(II) salts of organic carboxylic acids, e.g., tin(II) diacetate, tin(II) dioctanoate, tin(II) diethylhexanoate, and tin(II) dilaurate, and dialkyltin (IV) salts of organic carboxylic acids, e.g., dibutyltin diacetate, dibutyltin dilaurate, dibutyltin maleate and dioctyltin diacetate. Bismuth salts of organic carboxylic acids may also be utilized as the gelling catalyst, such as, for example, bismuth octanoate. Cyclic tertiary amines and/or long chain amines include dimethylbenzylamine, N,N,N',N'-tetramethylbutanediamine, dimethylcyclohexylamine, triethylenediamine, and combinations thereof, and combinations thereof. Specific examples of commercial gel catalysts are DABCO 33-LV and DABCO T-12 from Evonik.

Examples of trimerization catalysts include tris(dialkylaminoalkyl)-s-hexahydrotriazines, such as 1,3,5-tris(N,N-dimethylaminopropyl)-s-hexahydrotriazine; [2,4,6-Tris (dimethylaminomethyl) phenol]; potassium acetate, potassium octoate; tetraalkylammonium hydroxides such as tetramethylammonium hydroxide; alkali metal hydroxides such as sodium hydroxide; alkali metal alkoxides such as sodium methoxide and potassium isopropoxide; and alkali metal salts of long-chain fatty acids having 10 to 20 carbon atoms and, combinations thereof. Some commercially available trimerization catalysts include DABCO TMR, DABCO TMR-2, and DABCO TMR-30 from Evonik.

The catalyst can be from 2 to 7 parts of the formulated polyol composition based upon 100 parts of the formulated polyol composition. All individual values and subranges from 2 to 7 parts are included; for example, the catalyst can be from a lower limit of 2, 3, or 3.5 to an upper limit of 7, 6.5, or 6 parts of the formulated polyol composition based upon 100 parts of the formulated polyol composition.

The formulated polyol compositions disclosed herein can include a flame retardant. A number of flame retardants are known to those skilled in the art. Examples of the flame retardant include, but are not limited to, triethyl phosphate and tris(2-chloroisopropyl)-phosphate, among others. A specific example of a commercial flame retardant is LEVAGARD PP-2 from Laxness.

The flame retardant can be from 15 to 35 parts of the formulated polyol composition based upon 100 parts of the formulated polyol composition. All individual values and subranges from 15 to 35 parts are included; for example, the flame retardant can be from a lower limit of 15, 18, or 20 to an upper limit of 35, 33, or 30 parts of the formulated polyol composition based upon 100 parts of the formulated polyol composition.

One or more embodiments of the present disclosure provide that the formulated polyol compositions can include one or more additional components. Different additional components and/or different amounts of the additional components may be utilized for various applications. Examples of additional components include pigments, colorants, antioxidants, bioretardant agents, and combinations thereof, among others. Various amounts of the additional component may be utilized for different applications.

As mentioned, the formulated polyol compositions disclosed herein can provide an improved stability as compared to other compositions. Embodiments of the present disclosure provide that the formulated polyol compositions are advantageously phase stable, i.e. the formulated polyol compositions do not phase separate over particular time intervals, for 24 hours, 7 days, 14 days, 21 days, 30 days, 3 months, 6 months, 9 months, 12 months, and/or other time intervals.

The present disclosure provides foam formulations including the formulated polyol compositions disclosed herein and an isocyanate. The isocyanate may be a polyisocyanate. As used herein, "polyisocyanate" refers to a molecule having an average of greater than 1.0 isocyanate groups per molecule, e.g. an average functionality of greater than 1.0.

The isocyanate can be an aliphatic polyisocyanate, a cycloaliphatic polyisocyanate, an araliphatic polyisocyanate, an aromatic polyisocyanate, or combinations thereof, for example. Examples of isocyanates include, but are not limited to, polymethylene polyphenylisocyanate, toluene 2,4-12,6-diisocyanate (TDI), methylenediphenyl diisocyanate (MDI), polymeric MDI, triisocyanatononane (TIN), naphthyl diisocyanate (NDI), 4,4'-diisocyanatodicyclohexylmethane, 3-isocyanatomethyl-3,3,5-trimethylcyclohexyl isocyanate (isophorone diisocyanateIIPDI), tetramethylene diisocyanate, hexamethylene diisocyanate (HDI), 2-methylpentamethylene diisocyanate, 2,2,4-trimethylhexamethylene diisocyanate (THDI), dodecamethylene diisocyanate, 1,4-diisocyanatocyclohexane, 4,4'-diisocyanato-3,3'-dimethyldicyclohexylmethane, 4,4'-diisocyanato-2,2-dicyclohexylpropane, 3-isocyanatomethyl-1-methyl-1-isocyanatocyclohexane (MCI), 1,3-diisooctylcyanato-4-methylcyclohexane, 1,3-diisocyanato-2-methylcyclohexane, and combinations thereof, among others. As well as the isocyanates mentioned above, partially modified polyisocyanates including uretdione, isocyanurate, carbodiimide, uretonimine, allophanate or biuret structure, and combinations thereof, among others, may be utilized.

The isocyanate can be polymeric. As used herein "polymeric", in describing the isocyanate, refers to higher molecular weight homologues and/or isomers. For instance, polymeric methylene diphenyl isocyanate refers to a higher molecular weight homologue and/or an isomer of methylene diphenyl isocyanate.

As mentioned, the isocyanate can have an average functionality of greater than 1.0 isocyanate groups per molecule. For instance, the isocyanate can have an average functionality from 1.5 to 8.0. All individual values and subranges from 1.5 to 8.0 are included; for example, the isocyanate can have an average functionality from a lower limit of 1.5, 1.7, 2.0, 2.3, 2.5, 2.7, or 3.0 to an upper limit of 8.0, 7.5, 7.0, 6.7, 6.5, 6.3, 6.0, 5.7 or 5.5.

The isocyanate can have an isocyanate equivalent weight 80 g/eq to 500 g/eq. All individual values and subranges from 80 to 500 g/eq are included; for example, the isocyanate can have an isocyanate equivalent weight from a lower limit of 80, 82, 84, 90, or 100 to an upper limit of 500, 450, 400, 375, or 350 g/eq.

The isocyanate may be prepared by a known process. For instance, the polyisocyanate can be prepared by phosgenation of corresponding polyamines with formation of polycarbamoyl chlorides and thermolysis thereof to provide the polyisocyanate and hydrogen chloride, or by a phosgene-free process, such as by reacting the corresponding polyamines with urea and alcohol to give polycarbamates, and thermolysis thereof to give the polyisocyanate and alcohol, for example.

The isocyanate may be obtained commercially. Examples of commercial isocyanates include, but are not limited to, polyisocyanates under the trade names VORANATE™, VORACOR™, such as VORACOR™ CL 100, and PAPI™, such as PAPI™ 27, available from The Dow Chemical Company, among other commercial isocyanates.

The isocyanate can be from 90 to 130 parts of the foam formulation based upon 100 parts of the formulated polyol composition. All individual values and subranges from 90 to 130 parts are included; for example, the isocyanate can be from a lower limit of 90, 95, or 100 to an upper limit of 130, 125, or 120 parts of the foam formulation based upon 100 parts of the formulated polyol composition.

The isocyanate can be utilized such that the foam formulation has an isocyanate index in a range from 90 to 130. Isocyanate index can be determined as a quotient, multiplied by one hundred, of an actual amount of isocyanate utilized and a theoretical amount of isocyanate for curing. All individual values and subranges from 90 to 130 are included; for example, the foam formulation can have an isocyanate index from a lower limit of 90, 100, or 105 to an upper limit of 130, 125, or 120.

The foam formulations disclosed herein can desirably have a low dynamic viscosity at low temperatures. For instance, the foam formulations disclosed herein can have a dynamic viscosity that is equal to or less than 250, 225, or 215 cP at a temperature equal to or below 18° C. Foam formulations having a low dynamic viscosity at low temperatures may be advantageous for a number of applications The foam formulations disclosed herein can be cured to form a foam product. The foam products can be prepared using known methods and conditions, which may vary for different applications.

The foam product disclosed herein may be an open-cell foam. As used herein, a "open-cell foam" refers to a foam having an air flow of 0.75 standard cubic feet per minute (scfm) or greater. Air flow can be determined according to ASTM D-3574 Test G. Open-cell foams are desirable for a number of applications.

The foam products disclosed herein can have one or more desirable properties. For instance, the foam products disclosed herein can have a density from 8.0 to 15 kg/m$^3$. All individual values and subranges from 8.0 to 15.0 kg/m$^3$ are included; for example, the foam product can have a density from a lower limit of 8.0, 8.5, or 9.0 kg/m$^3$ to an upper limit of 15.0, 14.0, or 13.0 kg/m$^3$. Density can be determined according to ASTM D-1622/M.

The foam products disclosed herein can have: a compressive strength from 1.5 to 8.0 kPa. All individual values and subranges from 1.5 to 8.0 kPa are included; for example, the foam product can have a compressive strength from a lower limit of 1.5, 1.8, or 2.0 kPa to an upper limit of 8.0, 7.0, or 6.0 kPa. Compressive strength can be determined according to ASTM D-1621.

The foam products disclosed herein can have a conductivity from 30 to 60 mW/m K. All individual values and subranges from 30 mW/m K to 60 mW/m K are included; for example, the foam product can have a conductivity from a lower limit of 30, 33, or 35 mW/m K to an upper limit of 60, 55, or 45 mW/m K. The conductivity may be from a delta temperature of 10 to 40° C. Conductivity can be determined according to ASTM C-518.

EXAMPLES

In the Examples, various terms and designations for materials are used including, for instance, the following:

VORANOL™ 466 (sucrose propoxylated polyol; average hydroxyl functionality 4.36; average hydroxyl number 392.5 mg KOH/g; number average molecular weight 600; obtained from the Dow Chemical Company); VORANOL™ SD-301 (polyether triol; average hydroxyl functionality 3.0; average hydroxyl number 168 mg KOH/g; number average molecular weight 1000; obtained from the Dow Chemical Company); VORANOL™ 450 N (propoxylated homopolymer triol; average hydroxyl functionality 3; average hydroxyl number 374 mg KOH/g; number average molecular weight 450; obtained from the Dow Chemical Company); TEGOSTAB B 8427 (silicone surfactant; obtained from Evonik); NIAX A1 (blowing catalyst; bis(dimethyl aminoethyl)ether 70% active in DPG; obtained from MOMENTIVE); DABCO 33-LV (gel catalyst; obtained from Evonik); dipropylene glycol (crosslinker; polyhydric alcohol); LEVAGARD PP-2 (flame retardant; tris (2-chloroisopropyl)-phosphate; obtained from Laxness); triethyl phosphate (flame retardant); DABCO T-12 (gel catalyst; obtained from Evonik); PAPI™ 27 (isocyanate; polymethylene polyphenylisocyanate that contains MDI; obtained from the Dow Chemical Company).

Examples (EX) 1-8, formulated polyol compositions, were prepared as follows. For each Example, the items listed in Table 1 were combined in a respective container by mixing.

Comparative Examples (CE) A-I were prepared as Examples 1-8, with the change that the items indicated in Table 2 were respectively utilized

TABLE 1

|  | EX 1 | EX 2 | EX 3 | EX 4 | EX 5 | EX 6 | EX 7 | EX 8 |
|---|---|---|---|---|---|---|---|---|
| VORANOL™ 466 (parts) | 26 | 31 | 21 | 29 | 26 | 26 | 23 | 25.7 |
| VORANOL™ SD-301 (parts) | 17 | 12 | 22 | 17 | 20 | 14 | 17 | 17 |
| VORANOL™ 450N (parts) | 5 | 5 | 5 | 2 | 2 | 8 | 8 | 5 |
| Water (parts) | 16 | 16 | 16 | 16 | 16 | 16 | 16 | 16 |
| DABCO 33-LV (parts) | 1.5 | 1.5 | 1.5 | 1.5 | 1.5 | 1.5 | 1.5 | 1.5 |
| TEGOSTAB B 8427 (parts) | 3 | 3 | 3 | 3 | 3 | 3 | 3 | 3 |
| Dipropylene Glycol (parts) | 3 | 3 | 3 | 3 | 3 | 3 | 3 | 3 |
| NIAX A1 (parts) | 3.5 | 3.5 | 3.5 | 3.5 | 3.5 | 3.5 | 3.5 | 3.5 |
| LEVAGARD PP-2 (parts) | 20 | 20 | 20 | 20 | 20 | 20 | 20 | 20 |
| Triethyl Phosphate (parts) | 5 | 5 | 5 | 5 | 5 | 5 | 5 | 5 |
| DABCO T-12 (parts) | — | — | — | — | — | — | — | 0.3 |

TABLE 2

|  | CE A | CE B | CE C | CE D | CE E | CE F | CE G | CE H | CE I |
|---|---|---|---|---|---|---|---|---|---|
| VORANOL™ 466 (parts) | — | 31.0 | 27.1 | 26.5 | 26.5 | 32.1 | 26.6 | 26.1 | 27.1 |
| VORANOL™ SD-301 (parts) | 22.9 | — | 17.9 | 17.9 | 17.9 | 17.9 | 17.9 | 17.9 | 17.9 |
| VORANOL™ 450N (parts) | 6.7 | 6.0 | — | 5.2 | 5.2 | 6.3 | 5.2 | 5.1 | 5.3 |
| Water (parts) | 16 | 16 | 16 | 16 | 16 | 16 | 16 | 16 | 16 |
| DABCO 33-LV (parts) | 2.0 | 1.8 | 1.6 | 1.5 | 1.5 | 1.9 | 1.6 | — | 1.6 |
| TEGOSTAB B 8427 (parts) | 4.0 | 3.6 | 3.2 | — | 3.1 | 3.8 | 3.1 | 3.0 | 3.2 |
| Dipropylene Glycol (parts) | 4.0 | 3.6 | 3.2 | 3.1 | — | 3.8 | 3.1 | 3.0 | 3.2 |
| NIAX A1 (parts) | 4.7 | 4.2 | 3.7 | 3.6 | 3.6 | 4.4 | — | 3.6 | 3.7 |
| DABCO T-12 (parts) | 0.4 | 0.4 | 0.3 | 0.3 | 0.3 | 0.4 | 0.3 | 0.3 | 0.3 |
| LEVAGARD PP-2 (parts) | 26.9 | 24.1 | 21.1 | 20.6 | 20.6 | — | 20.7 | 20.3 | 21.1 |
| Triethyl Phosphate (parts) | 6.7 | 6.0 | 5.3 | 5.2 | 5.2 | 6.3 | 5.2 | 5.1 | — |

Examples 1-8 and Comparative Examples A-I were visually inspected 24 hours after formation and 6 months after formation; the results are reported in Table 3.

TABLE 3

|  | Appearance at 24 hours | Appearance at 6 months |
|---|---|---|
| Example 1 | Clear | Clear |
| Example 2 | Clear | Clear |
| Example 3 | Clear | Clear |
| Example 4 | Clear | Clear |
| Example 5 | Clear | Clear |
| Example 6 | Clear | Clear |
| Example 7 | Clear | Clear |
| Example 8 | Some turbidity | Some turbidity |
| Comparative Example A | Phase separated | Phase separated |
| Comparative Example B | Phase separated | Phase separated |
| Comparative Example C | Phase separated | Phase separated |
| Comparative Example D | Phase separated | Phase separated |
| Comparative Example E | Phase separated | Phase separated |
| Comparative Example F | Phase separated | Phase separated |
| Comparative Example G | Phase separated | Phase separated |
| Comparative Example H | Phase separated | Phase separated |
| Comparative Example I | Phase separated | Phase separated |

The data of Table 3 illustrates each of Examples 1-8 have an advantageously improved phase stability, i.e. phase separation has not occurred, as compared to each of Comparative Examples A-I at 24 hours after formation. Additionally, the data of Table 3 illustrates each of Examples 1-8 have an advantageously improved phase stability, i.e. phase separation has not occurred, as compared to each of Comparative Examples A-I at 6 months after formation.

Examples 9-16, foam formulations, were formed by combining PAPI™ 27 (115 parts) and each of Examples 1-8 (100 parts respectively each of Examples 1-8) in a respective container by mixing.

Dynamic viscosity of Example 9 was determined according to ASTM D-4878, this test method is a rotational procedure for determining dynamic viscosity of polyols in the range from 10 to 100 000 mPa·s (cP) at 15-50° C., at various temperatures. The results are reported in Table 4.

TABLE 4

| Temperature (° C.) | Dynamic viscosity (cP) |
|---|---|
| 16.3 | 227.56 |
| 16.9 | 220.86 |
| 18.0 | 205.16 |
| 19.2 | 184.93 |
| 20.0 | 171.46 |
| 24.0 | 122.16 |
| 25.9 | 107.77 |
| 28.5 | 91.83 |
| 29.7 | 85.94 |
| 31.6 | 76.23 |

TABLE 4-continued

| Temperature (° C.) | Dynamic viscosity (cP) |
|---|---|
| 33.8 | 67.04 |
| 35.8 | 61.59 |
| 38.8 | 52.93 |
| 42.1 | 42.50 |

The data of Table 4 illustrates that Example 9 has a low dynamic viscosity at low temperatures, e.g., less than 250 cP at a temperature equal to or below 18° C. Foam formulations having a low dynamic viscosity at low temperatures may be advantageous for a number of applications.

Examples 17-23, foam products, were formed by respectively curing Examples 9-15. The components were mixed for approximately 3 seconds, at 20-25° C., at 3000 rpm; then after 30 seconds free rise density was determined.

For each of Examples 17-23, tack free time, density, air flow, and compressive strength were determined. Tack free time was determined as the time interval over which a sample of the composition becomes non-tacky to the touch; density was determined according to ASTM D-1622/M; air flow was determined according to ASTM D-3574 Test G; and compressive strength was determined according to ASTM D-1621. The results are reported in Table 5.

TABLE 5

|  | Example 17 | Example 18 | Example 19 | Example 20 | Example 21 | Example 22 | Example 23 |
|---|---|---|---|---|---|---|---|
| Tack free time (seconds) | 12.2 | 11.3 | 12.3 | 11.7 | 12.2 | 11.8 | 12.3 |
| Density (kg/m³) | 10.4 | 11.9 | 11.1 | 9.7 | 9.7 | 11.4 | 11.4 |
| Air flow (scfm) | 0.78 | 0.99 | 1.28 | 0.99 | 0.85 | 1.04 | 1.42 |
| Compressive strength (kPa) | 5.6 | 2.3 | 4.0 | 4.7 | 4.5 | 3.5 | 4.0 |

The data of Table 5 illustrates that each of Examples 17-23 is an open-cell foam, e.g. each has a air flow of 0.75 scfm or greater.

The data of Table 5 illustrates that each of Examples 17-23 has a density from 8.0 to 15 kg/m³, which may be desirable for a number of applications.

The data of Table 5 illustrates that each of Examples 17-23 has a compressive strength from 1.5 to 8.0 kPa, which may be desirable for a number of applications.

Example 17 was repeated six additional times, i.e. Conductivity Runs 1-6, to determine conductivity at various temperatures. Conductivity was determined according to ASTM C-518. The results are reported in Table 6.

TABLE 6

|  | Delta Temperature (° C.) | Conductivity (mW/m K) |
|---|---|---|
| Example 17 (Conductivity Run 1) | 12 | 38.91 |
| Example 17 (Conductivity Run 2) | 12 | 38.79 |
| Example 17 (Conductivity Run 3) | 24 | 41.87 |
| Example 17 (Conductivity Run 4) | 24 | 41.71 |
| Example 17 (Conductivity Run 5) | 36 | 43.75 |
| Example 17 (Conductivity Run 6) | 36 | 43.64 |

The data of Table 6 illustrates that Examples 17 has a conductivity from 30 to 60 mW/m K at the various temperatures, which may be desirable for a number of applications.

What is claimed:

1. A formulated polyol composition comprising:
   a sucrose propoxylated polyol having an average hydroxyl functionality from 3.0 to 6.0, an average hydroxyl number from 360 to 460 mg KOH/g, and a number average molecular weight from 400 to 800;
   a polyether triol having an average hydroxyl functionality from 2.6 to 3.4, an average hydroxyl number from 100 to 200 mg KOH/g, and a number average molecular weight from 900 to 1200;
   a propoxylated homopolymer triol having an average hydroxyl functionality from 2.6 to 3.4, an average hydroxyl number from 300 to 500 mg KOH/g, and a number average molecular weight from 250 to 650,
   wherein the sucrose propoxylated polyol is from 21 to 31 parts of the formulated polyol composition based upon 100 parts of the formulated polyol composition, wherein the polyether triol is from 12 to 22 parts of the formulated polyol composition based upon 100 parts of the formulated polyol composition, and wherein the propoxylated homopolymer triol is from 0.1 to 8.0 parts of the formulated polyol composition based upon 100 parts of the formulated polyol composition;
   a surfactant;
   water;
   a crosslinker; and
   a catalyst selected from a blowing catalyst, a gel catalyst, and combinations thereof.

2. The formulated polyol composition of claim 1, wherein the formulated polyol composition includes a flame retardant.

3. The formulated polyol composition of claim 1, wherein the surfactant is from is from 0.5 to 5.0 parts of the formulated polyol composition based upon 100 parts of the formulated polyol composition.

4. The formulated polyol composition of claim 1, wherein the water is from 11 to 21 parts of the formulated polyol composition based upon 100 parts of the formulated polyol composition.

5. The formulated polyol composition of claim 1, wherein the crosslinker is from 0.5 to 5 parts of the formulated polyol composition based upon 100 parts of the formulated polyol composition.

6. The formulated polyol composition of claim 1, wherein the catalyst is from 2 to 7 parts of the formulated polyol composition based upon 100 parts of the formulated polyol composition.

7. The formulated polyol composition of claim 2, wherein the flame retardant is from 15 to 35 parts of the formulated polyol composition based upon 100 parts of the formulated polyol composition.

8. A foam formulation comprising:
   the formulated polyol composition of claim 1; and
   an isocyanate, wherein the isocyanate is from 90 to 130 parts of the foam formulation based upon 100 parts of the formulated polyol composition.

9. A foam product formed by curing the foam formulation of claim 8.

* * * * *